March 20, 1951 — P. A. VOIGT — 2,545,717
GROWING BENCH
Filed Dec. 21, 1945
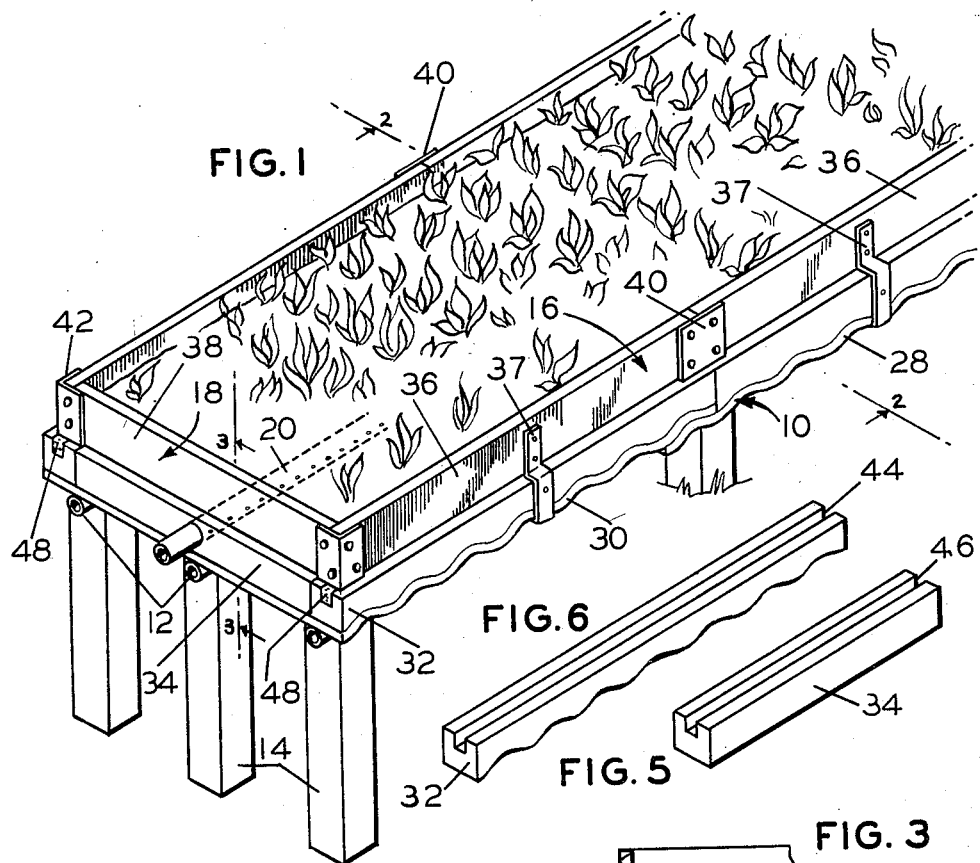
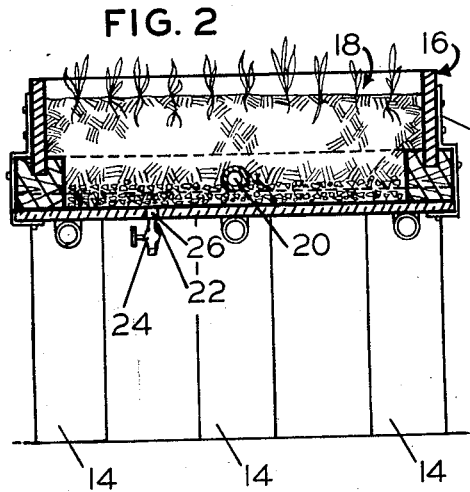
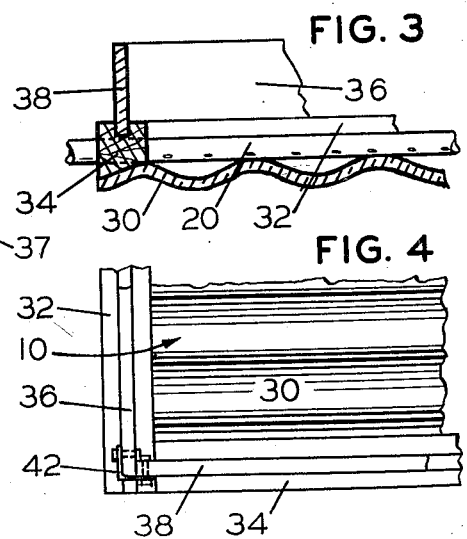
INVENTOR
PAUL A. VOIGT
BY Virgil C. Kluie
ATTORNEY Patented Mar. 20, 1951

2,545,717

UNITED STATES PATENT OFFICE 2,545,717

GROWING BENCH

Paul A. Voigt, Bellerose, N. Y., assignor to Johns-Manville Corporation, New York, N. Y., a corporation of New York Application December 21, 1945, Serial No. 636,320

8 Claims. (Cl. 47—18)

The invention concerns improved constructions for the benches used in greenhouses and the like for the growing of flowering and other plants, and is particularly directed to improvements in growing benches known as the automatic watering or sub-drainage type. These differ from the average growing bench in that the plants are watered by introducing the water in the soil and raising the level sufficiently to bring it up to the roots of the plants. One desirable feature of these benches is that they keep the moisture away from the leaves and prevent leaf mold and rotting.

In the past such growing benches have been made of wood or concrete, a wood such as cypress being the material commonly employed. Due to the porosity of the wood, or of the concrete when the latter is used, the benches must be thoroughly cleaned after each planting and generally sterilized with steam to kill bacteria and fungi lodging in the pores. Moreover, the wood rots out in the warm, humid atmosphere necessarily maintained while concrete benches which avoid this disadvantage are bulky, slow of construction and difficult to move.

The instant invention has for its principal object the provision of an improved growing bench, particularly of the sub-drainage type, which is constructed of a hard, dense material which does not provide ready lodgement for bacteria and the like, and which can be very easily washed down and kept sterile.

Another object of the invention is the provision of a growing bench of the kind referred to made of known types of building materials, particularly hardened, compressed, asbestos-cement materials.

A further object of the invention is the provision of an improved bench construction which may be readily assembled, is permanent and economical.

My invention will be more fully understood and further objects and advantages thereof will become apparent when reference is made to the more detailed description of a preferred embodiment of the invention which is to follow and to the accompanying drawings in which:

Fig. 1 is a perspective view of a growing bench in accordance with the invention;

Fig. 2 is a sectional view, on an enlarged scale, taken on the line 2—2 of Fig. 1;

Fig. 3 is a detail sectional view, on an enlarged scale, taken on the line 3—3 of Fig. 1;

Fig. 4 is a detail plan view, on an enlarged scale, of a corner of the bench shown in Fig. 1;

Fig. 5 is a perspective view of an element of the bench construction; and,

Fig. 6 is a perspective view of another element of the bench construction.

Referring now to the drawings and, more particularly to Figs. 1 and 2, there is shown a growing bench of the automatic watering or sub-drainage type. The bench includes a bed 10 supported on a conventional foundation made, for example as shown, of longitudinally extending rods or pipes 12 resting on posts 14. Projecting upwardly from the bed are side and end boards 16 and 18 respectively supported in a manner to provide a substantially water-tight seal with the bed, as will be later described.

The manner in which growing benches of the sub-drainage type are employed is illustrated in Fig. 2. As shown therein a layer of gravel is applied over the bed and the bench filled with soil to the desired depth. A perforated pipe 20 connected to a water line is buried in the soil. Usually a drain is provided, illustrated at 22 comprising a valve 24 and nipple 26, the latter penetrating the bed of the bench. The plants are watered by flow of water in the perforated pipe 20, the water passing through the perforations and into the soil. Excess water which seeps down into the gravel is drawn off at the required intervals by drain 22.

In accordance with the instant invention bed 10 of a bench of the type referred to above is made of corrugated sheets of a hardened, compressed, asbestos-cement material. These materials are made in a known manner by subjecting a wet mixture of asbestos and cement to high pressure in a press, the platens of which are of a corrugated contour corresponding to the contour of the finished sheet. The pressed sheets are then removed and cured. The sheets are conventionally made in 3′ 6″ widths with the corrugations extending lengthwise of the sheets. They are hard, dense, strong, smooth-surfaced on at least one side, and permanently resistant to deterioration.

As illustrated particularly in Fig. 1, a plurality of the sheets with their corrugations running widthwise of the bench may be employed to form a bed of the desired length, the sheets being overlapped with the end corrugation or corrugations of the underlapping sheet 28 nesting in the end corrugation or corrugations of the overlapping sheet 30. As many of the sheets may be employed as required to build up the bench to the desired length.

Side and end boards 16 and 18 forming the walls of the bench rest on base strips 32 and 34 respectively which, in turn, rest on the bed 10. The side and end boards are made up of members 36 and 38 respectively cut from flat sheets of a hardened, compressed, asbestos-cement material having similar properties with respect to strength, density, surface characteristics and resistance to deterioration as the material used for the bed. These members 36 and 38 are of a width, when combined with base strips 32 and 34, later described in detail, to provide a wall of the required height. As many of the members may be employed as is necessary to build a bench of the desired dimensions and end joints between adjacent members may be closed as by splices 40 comprising, preferably, sheet metal plates bolted or otherwise secured across the joint. The members are abutted at the corners between the end and side walls, as shown, and the corners are reinforced by corner elements 42, suitably of sheet metal and also bolted or otherwise attached to the members.

In order to provide a substantially water-tight joint between the walls and bed, side and end boards 16 and 18 are supported on the base strips 32 and 34, respectively. These strips are of semi-plastic nature and are preferably composed of a known type of bitumen-fiber mastic. A composition that is preferred is one comprising asphalt and fibers, say rag fibers, in about the proportion commonly used in asphalt saturated roofing paper. Such a composition may contain an admixed, finely-divided, inorganic filler to decrease the susceptibility of the asphalt to change in viscosity with temperature. The inorganic filler may be ground slate, comminuted diatomaceous earth, or the like, in relatively small amounts, say, from 3 to 5% of the weight of the ingredients. The well known compositions and processes used in making asphalt plank may also be employed in the construction of the base strips or they may be made of rubber or the like if desired. The base strips made of such materials are sufficiently plastic or deformable to conform to slightly uneven surfaces. Also, when seated on a surface, such as the surface of an asbestos-cement sheet, they develop in time, considerable adherence to the sheet. The impregnation of the fibers by the asphalt or other bitumen constituent is so thorough as to protect the fibers from decay or rot.

Strips 32 (see Figs. 1 and 5) which are to extend longitudinally of the bed have their lower face corrugated complementally to the corrugated sheets making up the bed and, also are uniformly tapered from a maximum depth at one end to a minimum depth at the other. The difference in depth of the opposite ends of the strips is equal to the thickness of the material of the bed sheets. As shown in Fig. 1, a strip 32 extends to the edge of the overlapping sheet 30 at the joint between bed sheets 28 and 30, the thinner end of the strip lying at such edge. The thicker end of another strip 32 is laid in abutting relationship to the thinner end of the first strip whereby the top surfaces of the strips lie in alignment. The strips are provided with longitudinally extending grooves 44 of a width to snugly receive the members making up the side boards 16.

Strips 34 which are to underlie the end boards 18 may have their lower faces transversely curved complementally to the portion of the corrugation on which they are to rest and are of such thickness or depth that their upper faces lie in the plane of the upper faces of strips 32. Strips 34 have longitudinally extending grooves 46 of the same type as grooves 42.

In constructing the bench, corrugated sheets of asbestos-cement material are cut to a length equal to the width of the bed. These are laid on pipes or other supports 12 with their corrugations extending transversely of the bench, adjacent sheets overlapping preferably to the extent of only one full corrugation. As many of the sheets are employed as is necessary to build up a bed of the required length. Base strips 32 and 34 are then laid to assume the positions shown in Fig. 1, with strips 34 across the ends preferably abutting against the longitudinal strips. The members 36 making up side board 16 are then inserted in the grooves 44, adjacent members being spliced together by plates 40. To hold the members in position, straps 37 placed at suitable intervals are bolted or otherwise secured to the members and extended around base strips 32 and beneath the bed where they are riveted or bolted to the bed sheets. Groove 46 of each end strip 34 is connected into grooves 44 of side strips 32 to permit the end board to abut against the side boards. This is done by simply notching strips 32 in alignment with groove 46, preferably after the strips are in position. This may be easily done with a knife or the like due to the composition of the strips. End members 38 are then inserted in the grooves 46 of strips 34 and secured to the side boards by corner members 42. The portions of grooves 44 which extend beyond the corner members are filled with a suitable putty, such as a bitumen-fiber sealing material 48 of any of the types well known in the art. Similar putty or sealing media may be employed around corner members 42 and splices 40 and at any other locations where a tight fit is not otherwise obtained to insure against leakage.

A construction in accordance with the invention provides a permanent, strong growing bench, resistant to deteriorations, readily cleanable and of economical cost. The bench is readily assembled and disassembled with a minimum of skilled labor. Due to the seal provided between the side boards and the corrugated bed, the bench is substantially water-tight.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A growing bench comprising a bed of corrugated sheet material, base strips overlying said bed, closed joints between the base strips and said bed, said base strips being longitudinally grooved, certain of the base strips extending transversely of the corrugations and being complementally corrugated on their faces contiguous to said bed, and wall members supported by said base strips and fitting in said grooves.

2. A growing bench comprising a bed of corrugated, asbestos-cement material, semi-rigid base strips of bituminous, fibrous material overlying said bed, closed joints between said base strips and said bed, said base strips having longitudinal grooves, certain of the base strips extending transversely of the corrugations and being complementally corrugated on their faces contiguous to said bed, and wall members of asbestos-cement material supported by said base strips and fitting in said grooves.

3. A growing bench comprising a bed formed of a plurality of corrugated sheets, one of said sheets overlapping a second sheet with an end corrugation of said first sheet nesting in a corrugation of the second sheet, base strips overlying said bed, closed joints between the base strips and the bed, one of said strips extending transversely of said corrugations of said first sheet and terminating at the overlapping end thereof and tapering in thickness complementally with the elevation of the end of said first sheet by said second sheet, and a second of said strips lying in abutting relationship with said first strip and extending transversely of the corrugations of said second sheet, the abutting portion of said second strip being of a thickness equal to the abutting end of said first strip plus the thickness of the first sheet whereby the upper faces of said strips lie in substantially the same plane, and wall members supported on said base strips.

4. A growing bench comprising a bed formed of a plurality of corrugated sheets with one of said sheets overlapping a second sheet and with an end corrugation of the first sheet nesting in a corrugation of the second sheet, base strips overlying said bed, closed joints between the base strips and the bed, said strips being complementally corrugated on their faces contiguous to said bed, one of said strips extending transversely of said corrugations of said first sheet terminating at the overlapping end thereof and tapering in thickness complementally with the elevation of said first sheet by said second sheet, and a second of said strips lying in abutting relationship with said first strip and extending transversely of the corrugations of said second sheet, the abutting portion of said second strip being of a thickness equal to the abutting end of said first strip plus the thickness of the first sheet, and wall members supported on said base strips.

5. A growing bench comprising a bed formed of a plurality of corrugated sheets of asbestos-cement material, one of said sheets overlapping a second sheet with an end corrugation of the first sheet nesting in a corrugation of the second sheet, semi-rigid base strips of bituminous, fibrous material overlying said bed, one of said strips extending transversely of said corrugations of said first sheet and terminating at the overlapping end thereof and tapering in thickness complementally with the elevation of said first sheet by said second sheet, and a second of said strips lying in abutting relationship with said first strip and extending transversely of the corrugations of said second sheet, the abutting portion of said second strip being of a thickness equal to the abutting end of said first strip plus the thickness of the first sheet, said base strips being longitudinally grooved, and wall members supported by said strips and fitting in said grooves.

6. A growing bench comprising a bed formed of a plurality of corrugated sheets of asbestos-cement material, one of said sheets overlapping a second sheet with an end corrugation of the first sheet nesting in a corrugation of the second sheet, semi-rigid base strips of bituminous, fibrous material overlying said bed, one of said strips extending transversely of said corrugations of said first sheet and terminating at the overlapping end thereof and tapering in thickness complementally with the elevation of said first sheet by said second sheet, and the second of said strips lying in abutting relationship with said first strip and extending transversely of the corrugations of said second sheet, the abutting portion of said second strip being of a thickness equal to the abutting end of said first strip plus the thickness of the first sheet, said base strips being longitudinally grooved, and wall members of asbestos-cement material supported by said strips and fitting in said grooves.

7. A growing bench comprising a bed of corrugated asbestos-cement sheet material, said bed having side and end marginal portions, base strips overlying the marginal portions of the bed, closed joints between the base strips and the bed, and side and end wall members supported on the base strips.

8. A growing bench comprising a bed of corrugated asbestos-cement sheet material, said bed having marginal portions, base strips overlying the marginal portions of the bed, closed joints between the base strips and the bed, certain of the base strips extending transversely of the corrugations and being complementally corrugated on their faces contiguous to the bed, and wall members supported on the base strips.

PAUL A. VOIGT.

REFERENCES CITED

The following references are of record in the file of this patent:

UNITED STATES PATENTS

| Number | Name | Date |
|---|---|---|
| 429,937 | Mitchell | June 10, 1890 |
| 784,756 | Pult | Mar. 14, 1905 |
| 858,187 | King | June 25, 1907 |
| 948,620 | Wait | Feb. 8, 1910 |
| 1,982,243 | Black | Nov. 27, 1934 |
| 2,021,929 | Voigt | Nov. 26, 1935 |